Aug. 18, 1931.   G. G. COOKE ET AL   1,819,872
INTERCHANGEABLE TIRE VALVE
Filed July 18, 1927
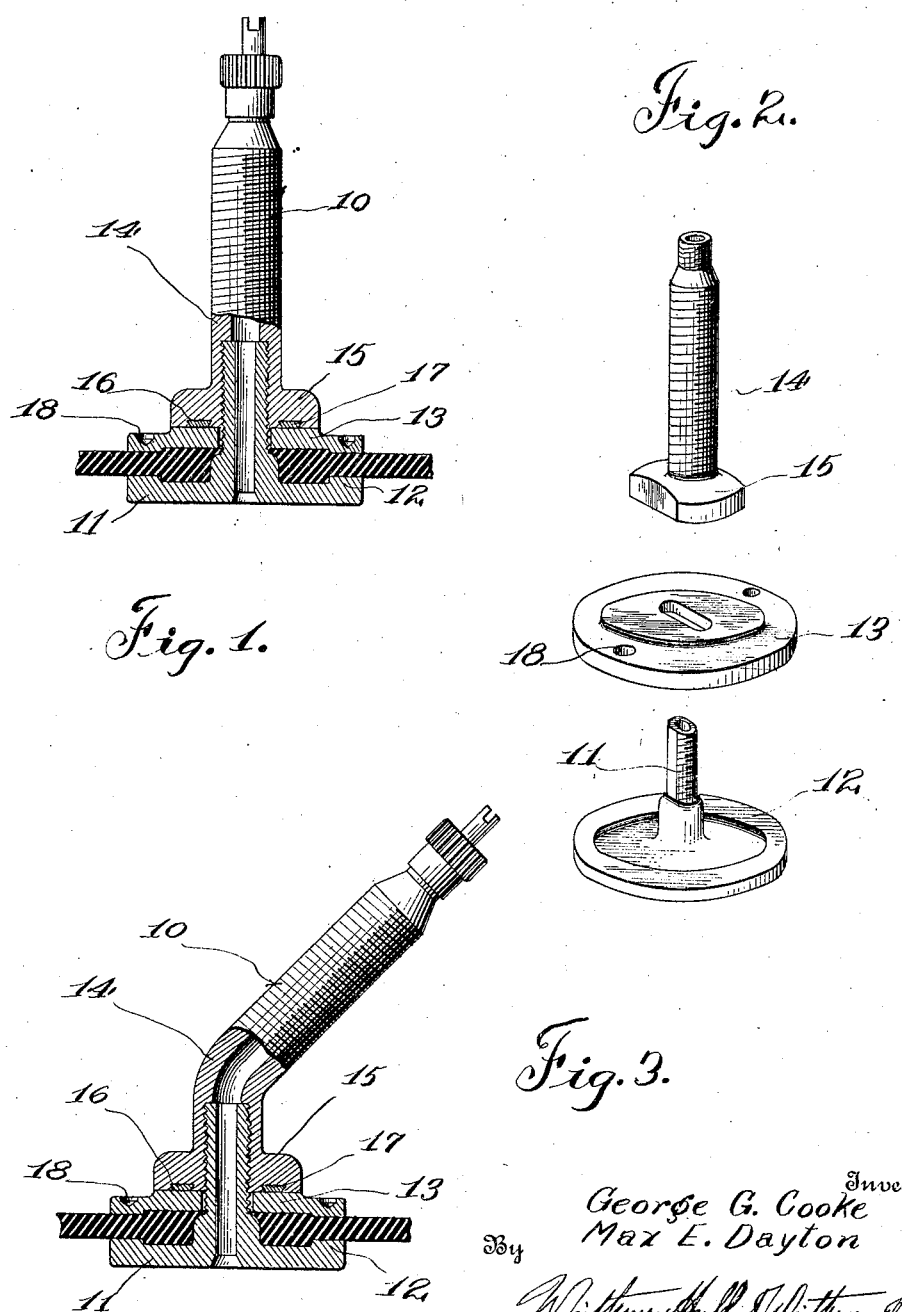
Inventor
George G. Cooke
Max E. Dayton
By
Attorney's Patented Aug. 18, 1931

1,819,872

UNITED STATES PATENT OFFICE

GEORGE G. COOKE AND MAX E. DAYTON, OF DETROIT, MICHIGAN, ASSIGNORS OF ONE-THIRD TO FREDERICK W. SMITH, OF DETROIT, MICHIGAN

INTERCHANGEABLE TIRE VALVE

Application filed July 18, 1927. Serial No. 206,669.

The invention relates to valve assemblies and more particularly to that class of valve used in connection with pneumatic tires.

The invention has as one of its objects to provide a valve of the above character distinguished by its simplicity of construction and operation which not only enhances its value, both mechanically and commercially, but provides a design, which may be manufactured economically and assembled and disassembled with facility.

Many of the advantages and much of the commercial value and acceptability of the present invention is attributed to the novel mounting of the valve stem upon the inner tube, these advantages being obtained particularly because the stem housing the actual valve mechanism is detachably mounted exteriorly of the inner tube, rendering the same interchangeable for stems of various contours. This type of valve finds particular utility when applying pneumatic tires to certain types of disk wheels which, owing to their particular design, preclude the use of the ordinary straight valve stem. As a consequence, manufacturers generally have been content to use, with these types of wheels specially constructed tubes having the required angular valve stem thereon.

It is therefore one of the primary objects of this invention to construct a valve in which the usual straight stem may be readily detached and an angular or curved stem substituted therefor.

The several objects, advantages and novel details of construction of this invention will be made more apparent as this description proceeds, especially when considered in connection with the accompanying drawings wherein;

Figure 1 is a side elevation partly in section of a valve embodying our invention;

Figure 2 is a detail perspective view of several parts of the valve, and

Figure 3 is a view similar to Figure 1 showing an angle stem for the valve.

Referring now to the drawings wherein like reference characters indicate like parts throughout the several views, it will be noted that the numeral 10 designates a valve having a plug 11 extending through a suitable aperture in an inner tube and formed with an enlarged head portion 12 arranged in contacting relation with the inner surface of the tube. As shown a disk 13 is non-rotatively sleeved upon the plug 11 and cooperates with the head portion 12 to efficiently clamp the tube and hold the valve in position. Threadedly mounted upon the plug 11 is a tubular valve stem 14 arranged to house the valve mechanism (not shown) and is formed with an enlarged nut 15 at the lower end thereof contacting with the upper surface of the disk and operable to clamp the latter upon the tube. In order to form an air tight seal between the disk 13 and valve stem 14 the latter is formed with a wedge-shaped recess 16 in the bottom surface thereof arranged to receive a gasket 17. This gasket is preferably constructed of ductile material such as lead, a composition of lead, antimony or other suitable substances forming a non-elastic but plastic composition which will permanently conform to the shape of the recess and have an extended area of contact with the disk, thus compensating for any irregularities in the disk and forming an efficient seal.

When the angle stem 10' illustrated in Figure 3 is interchanged for the straight stem 10 it is highly desirable that some means be provided for accurately positioning the angle stem relative to the wheel. To accomplish this result the disk 13 is formed with diametrically opposed apertures 18 for receiving a spanner wrench (not shown). Thus after assembling the valve if it is found that the stem is not at the proper angle with respect to the wheel the pressure upon the tube exerted by the disk 13 and head 12 is relieved by loosening the stem from the plug, and due to the fact that the disk is non-rotatively sleeved upon the plug the assembly may be turned as a unit until the proper adjustment is accomplished.

Thus from the foregoing it will be readily apparent that the herein described construction is one that facilitates assembly as the stem is detachably mounted upon the valve exteriorly of the tube. Moreover the angle of the stem with respect to the wheel may be varied without disassembling the valve.

While one embodiment of the invention has been described and illustrated herein somewhat in detail it will be immediately apparent to those skilled in this art that various changes and modifications may be resorted to without departing from the spirit and scope of this invention and to this end reservation is made to make such changes as may come within the purview of the accompanying claim.

What we claim as our invention is:

In a valve assembly for pneumatic tire tubes and the like, the combination with a plug having a base portion engageable with the inner side of the tube and having a stem portion extending through the tube, of a member non-rotatively mounted upon the stem portion aforesaid and engageable with the outer side of the tube, and a valve stem threadedly engaging the stem of the plug and having a portion engageable with the member to clamp the same against the tube, said member having a pair of slots therein adapted to receive a suitable tool for rotatively adjusting the plug to accurately position the valve stem.

In testimony whereof we affix our signatures.

GEORGE G. COOKE.
MAX E. DAYTON.